United States Patent
Omachi

(10) Patent No.: US 10,907,962 B2
(45) Date of Patent: Feb. 2, 2021

(54) DRIVING ASSISTANCE SYSTEM MOUNTED IN VEHICLE

(71) Applicant: TOYOTA JIDOSHA KABUSHIKI KAISHA, Toyota (JP)

(72) Inventor: Tadashi Omachi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 15/988,336

(22) Filed: May 24, 2018

(65) Prior Publication Data
US 2018/0356218 A1    Dec. 13, 2018

(30) Foreign Application Priority Data

Jun. 8, 2017    (JP) .................... 2017-113286

(51) Int. Cl.
*G01C 9/06*    (2006.01)
*G05D 1/12*    (2006.01)
(Continued)

(52) U.S. Cl.
CPC .............. *G01C 9/06* (2013.01); *B60W 30/00* (2013.01); *G01S 7/414* (2013.01); *G01S 13/726* (2013.01);
(Continued)

(58) Field of Classification Search
CPC ................. B60W 30/00; B60W 30/16; B60W 30/18145; G01S 7/414; G01S 13/931;
(Continued)

(56) References Cited

U.S. PATENT DOCUMENTS

| 6,795,765 B2 * | 9/2004 | Miyahara ............. B60W 30/16 |
| | | 701/96 |
| 7,522,091 B2 * | 4/2009 | Cong ................. B60K 31/0083 |
| | | 342/70 |

(Continued)

FOREIGN PATENT DOCUMENTS

| JP | 10-283462 A | 10/1998 |
| JP | 2005-71204 A | 3/2005 |

(Continued)

OTHER PUBLICATIONS

Reina et al., "Radar Sensing for Intelligent Vehicles in Urban Environments", Sensors, 2015, 15, 14661-14678.*

*Primary Examiner* — Catherine T. Rastovski
(74) *Attorney, Agent, or Firm* — Sughrue Mion, PLLC

(57) ABSTRACT

A driving assistance system mounted in a vehicle includes a driving assistance control device configured to determine whether or not an object is a monitoring target. The driving assistance control device is configured to calculate an inclination direction of a detection surface of the object in a reference coordinate system fixed with respect to the vehicle in a horizontal plane. A first inclination state is a state where an angle formed by the inclination direction and a lateral direction of the vehicle is less than a first threshold. A second inclination state is a state where the angle is greater than a second threshold that is equal to or greater than the first threshold. The driving assistance control device is configured to determine the object in the first inclination state as the monitoring target and to exclude the object in the second inclination state from the monitoring target.

10 Claims, 11 Drawing Sheets

(51) Int. Cl.
*G01S 13/931* (2020.01)
*G01S 13/72* (2006.01)
*G01S 7/41* (2006.01)
*B60W 30/00* (2006.01)

(52) U.S. Cl.
CPC .............. *G01S 13/931* (2013.01); *G05D 1/12* (2013.01); *G01S 7/415* (2013.01); *G01S 2013/93271* (2020.01)

(58) Field of Classification Search
CPC ........... G01S 13/726; G01S 2013/3271; G01S 2013/93271; G01S 7/415; G01C 9/06; G05D 1/12
See application file for complete search history.

(56) References Cited

U.S. PATENT DOCUMENTS

2015/0353078 A1* 12/2015 Kaminade ......... B60W 30/0956 701/1
2018/0204345 A1 7/2018 Motohashi et al.

FOREIGN PATENT DOCUMENTS

| JP | 2009-288099 A | 12/2009 |
| JP | 2013-36978 A | 2/2013 |
| WO | 2017/047282 A1 | 3/2017 |

\* cited by examiner

DRIVING ASSISTANCE SYSTEM MOUNTED IN VEHICLE

INCORPORATION BY REFERENCE

The disclosure of Japanese Patent Application No. 2017-113286 filed on Jun. 8, 2017 including the specification, drawings and abstract is incorporated herein by reference in its entirety.

BACKGROUND

1. Technical Field

The present disclosure relates to a driving assistance system mounted in a vehicle.

2. Description of Related Art

A driving assistance system mounted in a vehicle performs a driving assistance control for assisting in driving of the vehicle. A following traveling control or a collision avoidance control is known as such a driving assistance control.

The following traveling control is a control for following a preceding vehicle while maintaining a set inter-vehicle distance. When the inter-vehicle distance to the preceding vehicle is less than a set value, the driving assistance system automatically operates a brake device to decelerate the vehicle.

The collision avoidance control is a control for avoiding a collision with an obstacle (another vehicle, a bicycle, a pedestrian, or the like) on the course. When the driving assistance system determines that the possibility of colliding with an obstacle is high, the driving assistance system automatically operates the brake device to decelerate the vehicle.

In any case of the following traveling control and the collision avoidance control, the preceding vehicle or the obstacle in front of the vehicle needs to be recognized as a "monitoring target" using a vehicle-mounted sensor. The vehicle-mounted sensor not only detects the preceding vehicle or the obstacle in the lane, but also detects a "roadside structure" such as a guardrail and a delineator installed on the roadside. When such a roadside structure is erroneously determined as a preceding vehicle or an obstacle, unnecessary deceleration may be performed. Unnecessary deceleration (erroneous deceleration) causes a driver to feel uncomfortable or anxious and decreases the reliability of the driving assistance system. Accordingly, when the driving assistance control is performed, it is desirable to distinguish between the monitoring target (an event where deceleration has to be performed) and the roadside structure (an event where deceleration does not have to be performed).

A target detection device that determines whether or not an object ahead is a vehicle is disclosed in Japanese Unexamined Patent Application Publication No. 2009-288099 (JP 2009-288099 A). The target detection device uses an electromagnetic wave such as laser light as an exploration wave. The target detection device radiates and scans the exploration wave in the horizontal direction and determines whether or not the object is a vehicle based on a reflective wave from the object. More specifically, the target detection device analyzes a horizontal distribution of reflection intensity and determines whether or not the object is a vehicle based on the number of peaks, the position of each peak, the distribution width, and the like of the reflection intensity.

SUMMARY

As described above, in the driving assistance control, it is desirable to determine whether or not an object in front of a vehicle is a monitoring target. In the related art disclosed in JP 2009-288099 A, the horizontal distribution of the reflection intensity of the reflective wave from the object is analyzed in detail, and the number of peaks, the position of each peak, the distribution width, and the like of the reflection intensity are calculated for determination. However, such a method needs a high calculation load and a large amount of calculation time. An increase in calculation load and calculation time may cause a delay in driving assistance control.

The disclosure provides a driving assistance system that can determine whether or not an object in front of a vehicle is a monitoring target in a driving assistance control without increasing a calculation load and calculation time.

A first aspect of the disclosure provides a driving assistance system mounted in a vehicle. The driving assistance system includes: an object detection device configured to detect, by using a sensor, an object in front of the vehicle and to acquire object detection information that indicates a relative position of a detection surface of the object with respect to the vehicle; and a driving assistance control device configured to determine whether or not the object is a monitoring target and to perform a control for avoiding a collision with the monitoring target or a control for following the monitoring target. The driving assistance control device is configured to calculate, based on the object detection information, an inclination direction of the detection surface of the object in a reference coordinate system in a horizontal plane, the reference coordinate system being fixed with respect to the vehicle, a first inclination state is a state where an angle formed by the inclination direction and a lateral direction of the vehicle is less than a first threshold, a second inclination state is a state where the angle is greater than a second threshold that is equal to or greater than the first threshold and the driving assistance control device is configured to determine the object in the first inclination state as the monitoring target and to exclude the object in the second inclination state from the monitoring target.

According to the first aspect of the disclosure, the driving assistance system detects the object using the sensor and calculates the inclination direction of the detection surface of the object in the reference coordinate system based on the object detection information. Determination as to whether the object is in the "first inclination state" that may not be easily passed when seen from the vehicle, or the "second inclination state" that can be easily passed when seen from the vehicle can be performed based on the inclination direction. When the object is in the first inclination state, the driving assistance system determines the object as the monitoring target in a driving assistance control. Meanwhile, when the object is in the second inclination state, the driving assistance system excludes the object from the monitoring target.

It is very likely that the inclination state of a roadside structure that is disposed along the lane boundary is the "second inclination state" that can be easily passed when seen from the vehicle. Since such a roadside structure is excluded from the monitoring target, unnecessary deceleration (erroneous deceleration) is suppressed in the driving assistance control. Since unnecessary deceleration is suppressed, uncomfortable and anxious feelings of the driver are reduced. Consequently, the reliability of the driving assistance system is further improved.

According to the first aspect of the disclosure, a monitoring target determination process is performed based on the "inclination direction of the detection surface of the object". The inclination direction of the detection surface of the object can be simply calculated from the position information of the detection surface of the object acquired by the sensor. A "horizontal distribution of the reflection intensity of a reflective wave from the object" does not need to be analyzed in detail unlike the related art disclosed in JP 2009-288099 A. Only the "position of the detection surface of the object" may be analyzed for calculating the inclination direction of the detection surface of the object. Accordingly, the calculation load and the calculation time required for the monitoring target determination process are reduced. Reduction in the calculation load and the calculation time means improvement in the responsiveness of the driving assistance control, which is desirable.

In the driving assistance system according to the first aspect, the object may be detected by the sensor at a plurality of detection points on the detection surface; the object detection information may include a relative position of each of the detection points; and the driving assistance control device may be configured to calculate the inclination direction from a positional relationship of the detection points in the reference coordinate system.

According to the above configuration, the inclination direction of the detection surface of the object can be simply calculated from the positional relationship of the detection points in the reference coordinate system.

In the driving assistance system according to the first aspect, an angle defined by a direction of a tangent of a lane boundary and the lateral direction of the vehicle in the reference coordinate system may be a tangent inclination angle; a region where the tangent inclination angle may be in a range of 45 degrees to 90 degrees is a determination region when the lane boundary is curved in front of the vehicle; and the driving assistance control device may be configured to determine whether or not the object present within the determination region is the monitoring target.

According to the above configuration, the determination region that is suitable for determination is considered when the lane boundary is curved in front of the vehicle. Accordingly, the accuracy of the monitoring target determination process is further improved.

In the driving assistance system according to the first aspect, the driving assistance control device may be configured to perform a history determination process based on a history of an inclination state of the object and the driving assistance control device may be configured to exclude the object from the monitoring target when the inclination state of the object tends to be changed in a direction toward the second inclination state from the first inclination state along with an elapse of time.

In the driving assistance system according to the first aspect, the driving assistance control device may be configured to perform a history determination process based on a history of an inclination state of the object and the driving assistance control device may be configured to determine the object as the monitoring target when the inclination state of the object tends to be changed in a direction toward the first inclination state from the second inclination state along with an elapse of time.

In the driving assistance system according to the first aspect, the driving assistance control device may be configured to perform a history determination process based on a history of an inclination state of the object and the driving assistance control device may be configured to determine the object as the monitoring target when the inclination state of the object is maintained to be constant along with an elapse of time.

According to the above configurations, the "history determination process" that is the monitoring target determination process based on the history (temporal change) of the inclination state of the object is additionally performed. Combining the two types of monitoring target determination processes further improves the accuracy of determination.

In the driving assistance system according to the first aspect, the driving assistance control device may be configured to perform the history determination process when accuracy of the object detection information is lower than an allowed range.

According to the above configuration, the accuracy of the object detection information is considered. When the accuracy of the object detection information is low, the accuracy of calculating the inclination direction of the detection surface of the object is decreased. In this case, it is desirable to focus on a temporal change tendency of the inclination direction rather than the inclination direction itself. Thus, when the accuracy of the object detection information is lower than the allowed range, the history determination process is performed. Accordingly, a decrease in the accuracy of determination can be suppressed.

A second aspect of the disclosure provides a driving assistance system that is mounted in a vehicle. The driving assistance system includes: an object detection device configured to detect, using a sensor, an object in front of the vehicle and to acquire object detection information that indicates a relative position of a detection surface of the object with respect to the vehicle; and a driving assistance control device configured to determine whether or not the object is a monitoring target and to perform a control for avoiding a collision with the monitoring target or a control for following the monitoring target. The driving assistance control device is configured to calculate, based on the object detection information, an inclination direction of the detection surface of the object in a reference coordinate system in a horizontal plane, the reference coordinate system being fixed with respect to the vehicle. A first inclination state is a state where an angle defined by the inclination direction and a lateral direction of the vehicle is less than a first threshold, a second inclination state is a state where the angle is greater than a second threshold that is equal to or greater than the first threshold, the driving assistance control device is configured to determine the object as the monitoring target when an inclination state of the object tends to be changed in a direction toward the first inclination state from the second inclination state along with an elapse of time and the driving assistance control device is configured to exclude the object from the monitoring target when the inclination state of the object tends to be changed in a direction toward the second inclination state from the first inclination state along with the elapse of time.

According to the second aspect of the disclosure, the driving assistance system detects the object using the sensor and calculates the inclination direction of the detection surface of the object in the reference coordinate system based on the object detection information. Determination as to whether the object is in the "first inclination state" that may not be easily passed when seen from the vehicle, or the "second inclination state" that can be easily passed when seen from the vehicle can be performed based on the inclination direction. According to the second aspect of the disclosure, the monitoring target determination process is performed based on the "temporal change (history) of the inclination state of the object".

For example, a case where the inclination state of the object tends to be changed in a direction toward the first inclination state side from the second inclination state side along with the elapse of time is considered. Such an inclination change tendency means that the possibility of the vehicle colliding with the object is gradually increased. Accordingly, the object showing such an inclination change tendency is regarded as the monitoring target. Conversely, when the inclination state of the object tends to be changed in a direction toward the second inclination state side from the first inclination state side along with the elapse of time, such an inclination change tendency means that the possibility of the vehicle colliding with the object is gradually decreased. Accordingly, the object showing such an inclination change tendency is excluded from the monitoring target.

Accordingly, the monitoring target determination process can be performed with high accuracy by considering the "temporal change (history) of the inclination state of the object".

A third aspect of the disclosure provides a driving assistance system mounted in a vehicle. The driving assistance system includes: a sensor disposed to detect an object in front of the vehicle; a first electronic control unit configured to calculate, from an output signal of the sensor, object detection information that indicates a relative position of a detection surface of the object with respect to the sensor; and a second electronic control unit configured to calculate, based on the object detection information, an inclination direction of the detection surface of the object in a reference coordinate system in a horizontal plane, the reference coordinate system being fixed with respect to the vehicle, determine the object in a first inclination state that is a state where an angle defined by the inclination direction and a lateral direction of the vehicle is less than a first threshold, as a monitoring target, exclude, from the monitoring target, the object in a second inclination state that is a state where the angle is greater than a second threshold that is equal to or greater than the first threshold, and perform a control for avoiding a collision with the monitoring target or a control for following the monitoring target.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the disclosure will be described with reference to the appended drawings.

1. Overview

Figure 1:
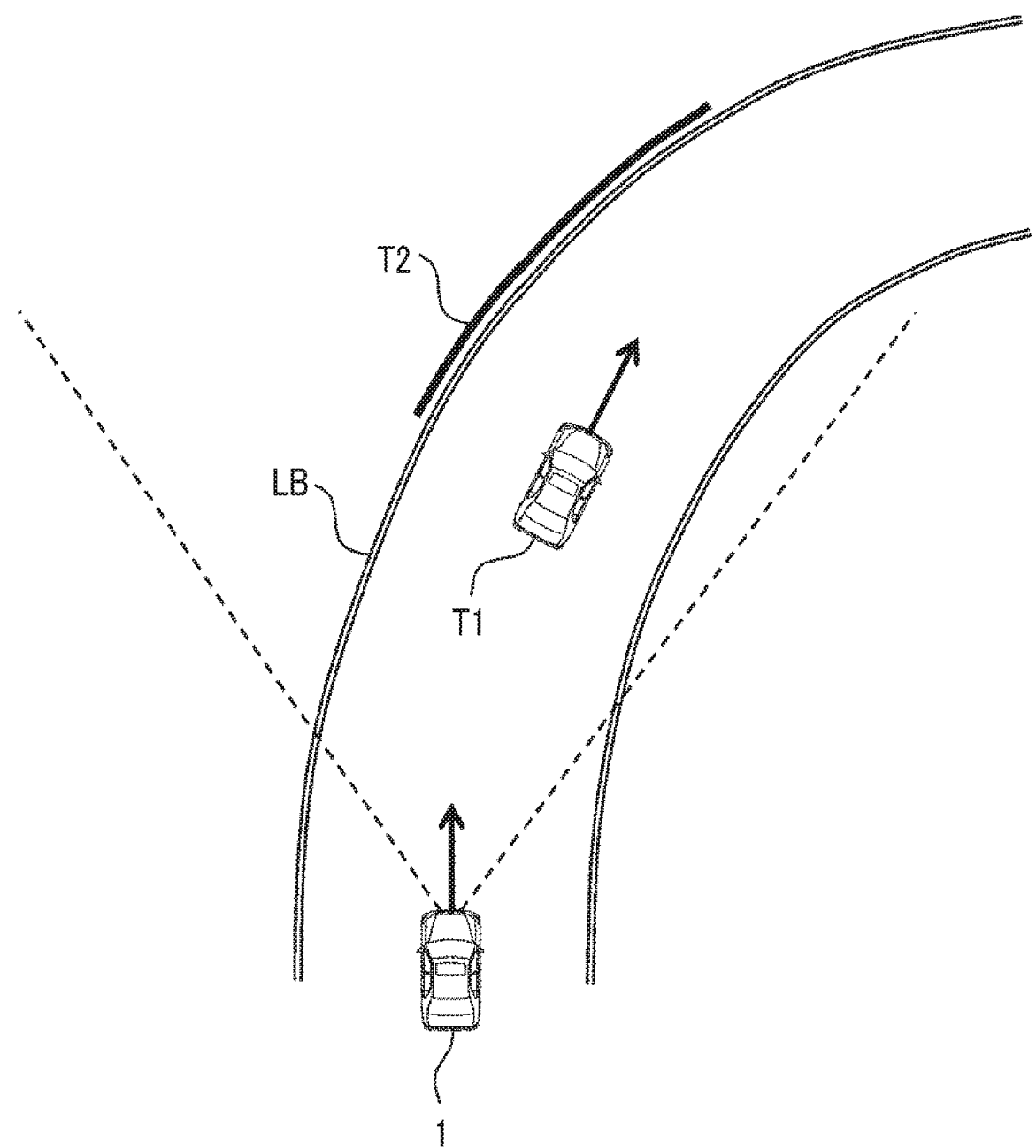
FIG. 1 is a schematic diagram illustrating an example of a vehicle and a front object according to an embodiment of the disclosure.

FIG. 1 is a schematic diagram illustrating an example of a vehicle 1 and a front object according to the embodiment. The vehicle 1 is traveling in a lane along the lane. The front object is present in front of the vehicle 1. In FIG. 1, a preceding vehicle T1 and a roadside structure T2 are illustrated as examples of the front object. The preceding vehicle T1 is traveling in the lane in front of the vehicle 1 along the lane. Meanwhile, the roadside structure T2 is present on the roadside, that is, outside the lane, in front of the vehicle 1. The roadside structure T2 is exemplified by a guardrail or a group of delineators. As illustrated in FIG. 1, the roadside structure T2 is disposed along a lane boundary LB.

A driving assistance system is mounted in the vehicle 1 according to the embodiment. The driving assistance system performs a driving assistance control for assisting in driving of the vehicle 1. A following traveling control or a collision avoidance control is known as such a driving assistance control.

The following traveling control is a control for following the preceding vehicle T1 while maintaining a set inter-vehicle distance, and is referred to as adaptive cruise control (ACC). When the inter-vehicle distance to the preceding vehicle T1 is less than a set value, the driving assistance system automatically operates a brake device to decelerate the vehicle 1.

The collision avoidance control is a control for avoiding a collision with an obstacle (the preceding vehicle T1, a bicycle, a pedestrian, or the like) on the course, and is referred to as pre-crash safety system (PCS). When the driving assistance system determines that the possibility of colliding with an obstacle is high, the driving assistance system automatically operates the brake device to decelerate the vehicle 1.

The driving assistance system of the vehicle 1 according to the embodiment performs at least one of the following traveling control or the collision avoidance control. In any case of the following traveling control and the collision avoidance control, the preceding vehicle T1 or the obstacle needs to be recognized as a "monitoring target (an event where deceleration has to be performed)" using a vehicle-mounted sensor. The vehicle-mounted sensor not only detects the preceding vehicle T1 or the obstacle in the lane, but also detects the roadside structure T2 outside the lane. When the roadside structure T2 is erroneously determined as the monitoring target in the driving assistance control, unnecessary deceleration may be performed. Unnecessary deceleration (erroneous deceleration) causes a driver to feel uncomfortable or anxious and decreases the reliability of the driving assistance system. Accordingly, when the driving assistance control is performed, it is desirable to accurately determine whether or not the object in front of the vehicle 1 is the monitoring target.

First, a comparative example in which the monitoring target is determined using map information is considered. The map information includes the position of the lane boundary LB in each road. The relative position of the lane boundary LB around the vehicle 1 can be recognized by combining the map information with position-and-azimuth information that is acquired by a global positioning system (GPS) (such a process is referred to as "localization"). Determination as to whether the object detected by the sensor is the monitoring target in the lane or the roadside structure T2 outside the lane can be performed based on the positional relationship of the object and the lane boundary LB.

The relative position of the lane boundary LB acquired by the localization includes a localization error. Accordingly, in the method of the comparative example, the monitoring target may not be determined with high accuracy at all times.

Figure 2:
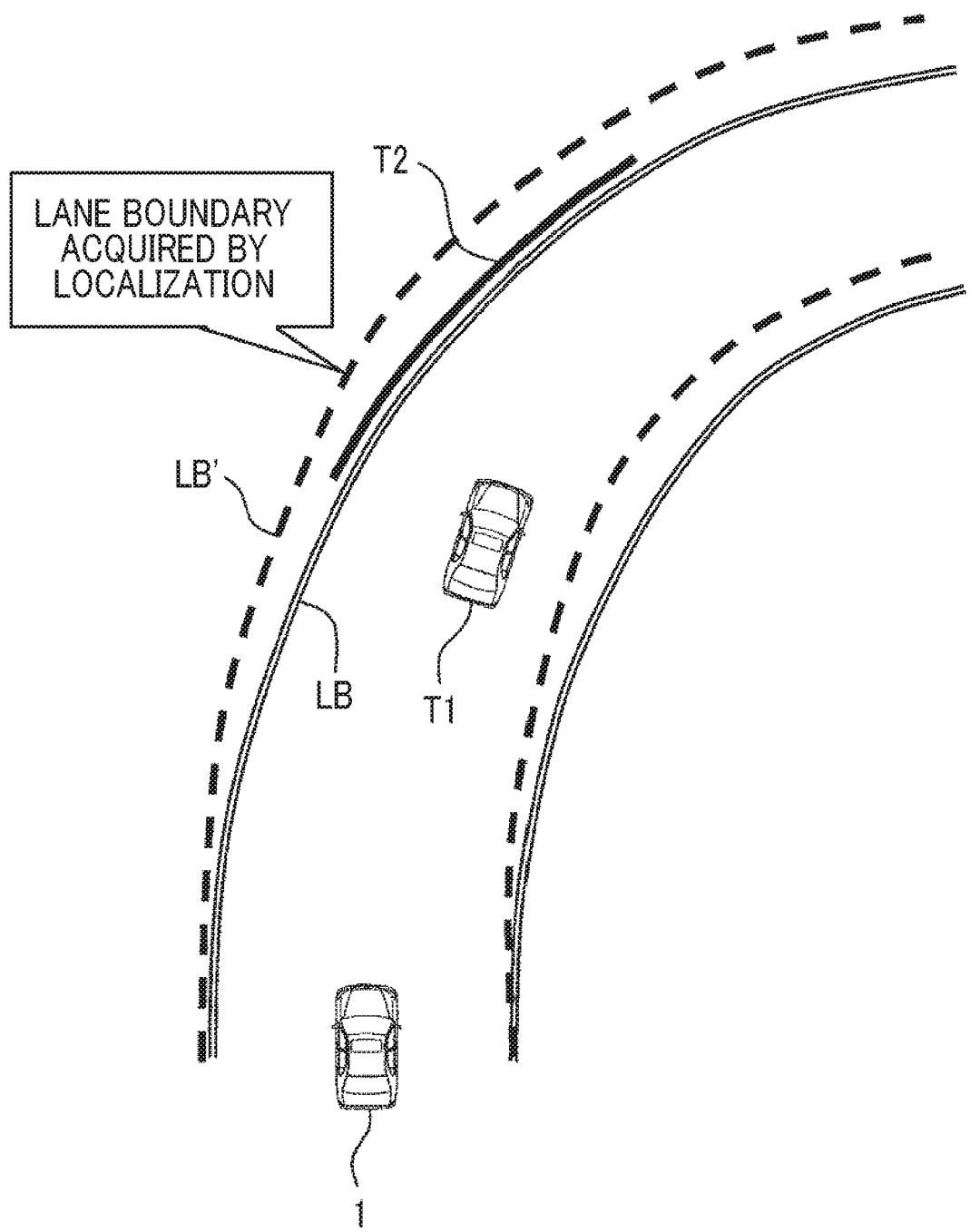
FIG. 2 is a conceptual diagram for describing an example of a problem that may arise in a comparative example.

FIG. 2 illustrates an example of a problem that may arise in the comparative example. In FIG. 2, the reference sign LB denotes an actual lane boundary, and the reference sign LB' denotes a lane boundary acquired by the localization. Since there is a localization error, the lane boundary LB' acquired by the localization deviates from the actual lane boundary LB. Consequently, the roadside structure T2 detected by the sensor is positioned inside the lane boundary LB'. In this case, the roadside structure T2 is erroneously determined as an obstacle in the lane, and thus erroneous deceleration may be performed.

An approach different from the comparative example is suggested in the embodiment. The driving assistance system according to the embodiment does not use the positional relationship of the object and the lane boundary LB for determining the monitoring target. Instead, the driving assistance system according to the embodiment focuses on the "inclination of the object". Hereinafter, a monitoring target determination process based on the inclination of the object will be described.

Figure 3:
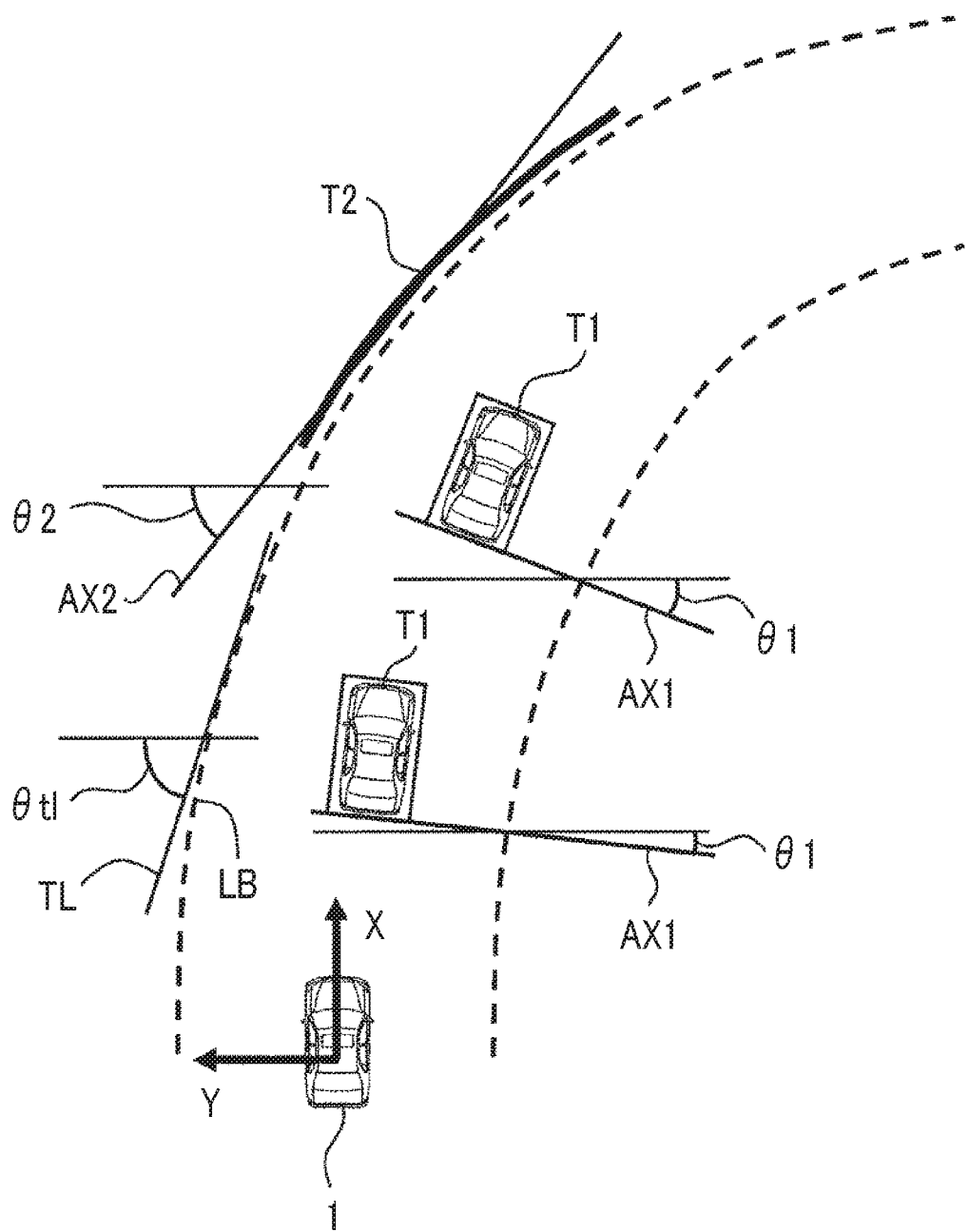
FIG. 3 is a conceptual diagram for describing a monitoring target determination process according to the embodiment of the disclosure.

FIG. 3 is a conceptual diagram for describing the monitoring target determination process according to the embodiment. Similar to the case of FIG. 1, the preceding vehicle T1 and the roadside structure T2 are present in front of the vehicle 1. Of the preceding vehicle T1 and the roadside structure T2, the preceding vehicle T1 is the "monitoring target" in the driving assistance control.

First, a "reference coordinate system" used in the embodiment will be defined. The reference coordinate system is a coordinate system that is fixed with respect to the vehicle 1. The reference coordinate system changes along with the movement or turning of the vehicle 1. Particularly, the reference coordinate system in the horizontal plane is considered since the inclination of the object in the horizontal plane is considered in the embodiment. The reference coordinate system in the horizontal plane is set in an X direction and a Y direction that are orthogonal to each other. For example, the X direction is a traveling direction of the vehicle 1, and the Y direction is a lateral direction of the vehicle 1. However, the combination of the X direction and the Y direction is not limited to such an example. Any combination may be used insofar as the reference coordinate system is fixed with respect to the vehicle 1 in the horizontal plane.

The sensor mounted in the vehicle 1 detects the object in front of the vehicle 1. More specifically, the sensor detects a surface facing the vehicle 1, among surfaces of the object. Hereinafter, the surface of the object detected by the sensor will be referred to as a "detection surface". For example, when the object is the preceding vehicle T1, the detection surface is typically a rear surface of the preceding vehicle T1. When the object is the roadside structure T2, the detection surface is a partial surface of the roadside structure T2. In the case of delineators, a set of delineators in series is recognized as one object, and a plane including the series of delineators is the detection surface.

The driving assistance system can recognize the relative position of the detection surface with respect to the vehicle 1, that is, the position of the detection surface in the reference coordinate system, from detection information of the sensor. The driving assistance system can calculate an inclination direction of the detection surface in the reference coordinate system from the position of the detection surface. Hereinafter, a representative straight line that indicates the inclination direction of the detection surface of the object in the reference coordinate system will be referred to as an "inclination axis AX". An angle (0 degrees to 90 degrees) formed by the inclination axis AX and a reference direction in the reference coordinate system will be referred to as an "inclination angle θ". In the example illustrated in FIG. 3, the reference direction is the Y direction (the lateral direction of the vehicle 1). However, the reference direction is not limited to the Y direction.

In FIG. 3, the inclination axis AX and the inclination angle θ of the preceding vehicle T1 are denoted by the reference signs AX1, θ1 respectively. The inclination axis AX and the inclination angle θ of the roadside structure T2 are denoted by the reference signs AX2, θ2 respectively. As illustrated in FIG. 3, the inclination axis AX1 of the preceding vehicle T1 is relatively close to the Y direction, and the inclination angle θ1 of the preceding vehicle T1 is relatively small. Meanwhile, the inclination axis AX2 of the roadside structure T2 is relatively away from the Y direction, and the inclination angle θ2 of the roadside structure T2 is relatively large.

The inclination of a tangent TL of the lane boundary LB is considered in order to examine the tendency of each of the inclination angles θ1, θ2 in more detail. Hereinafter, the angle formed by the reference direction and the direction of the tangent TL of the lane boundary LB in the reference coordinate system will be referred to as a "tangent inclination angle θt1". In the example illustrated in FIG. 3, a curved lane is present in front of the vehicle 1, that is, the lane boundary LB is curved. In this case, the tangent inclination angle θt1 is decreased from 90 degrees as the distance from the vehicle 1 is increased.

Since the roadside structure T2 is disposed along the lane boundary LB, the inclination axis AX2 of the roadside structure T2 is almost parallel to the tangent TL of the lane boundary LB. Thus, the inclination angle θ2 of the roadside structure T2 shows the same tendency as the tangent inclination angle θt1. Since the preceding vehicle T1 travels along the lane, the inclination axis AX1 is almost perpendicular to the tangent TL of the lane boundary LB (in other words, almost parallel to a normal line of the lane boundary LB). Thus, the inclination angle θ1 of the preceding vehicle T1 shows the same tendency as an angle "90−θt1". Hereinafter, the angle (90−θt1) will be referred to as a "normal line inclination angle".

Figure 4:
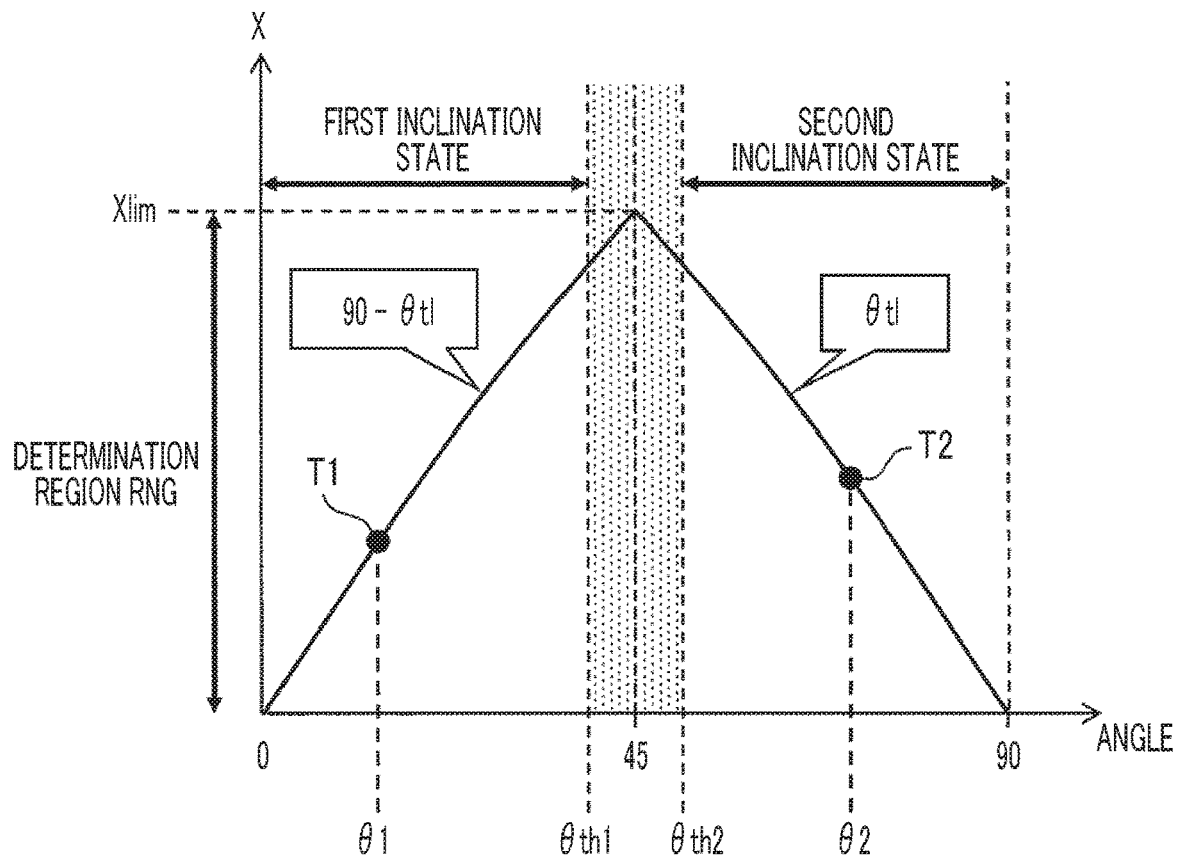
FIG. 4 is a graph for describing the monitoring target determination process according to the embodiment of the disclosure.

FIG. 4 is a graph illustrating a relationship among the inclination angle θ (θ1, θ2) of the object, the tangent inclination angle θt1, and the normal line inclination angle (90−θt1). The horizontal axis denotes an angle. The vertical axis denotes an X position in the reference coordinate system, that is, a distance from the vehicle 1 in the X direction. As described above, the tangent inclination angle θt1 is decreased from 90 degrees as the distance from the vehicle 1 is increased. Meanwhile, the normal line inclination angle (90−θt1) is increased from 0 degrees as the distance from the vehicle 1 is increased. The X position at which both of the tangent inclination angle θt1 and the normal line inclination angle (90−θt1) are equal to 45 degrees is a limit position Xlim. Hereinafter, a region from the vehicle 1 to the limit position Xlim will be referred to as a "determination region RNG". In the determination region RNG, the tangent inclination angle θt1 is in a range of 45 degrees to 90 degrees, and the normal line inclination angle (90−θt1) is in a range of 0 degrees to 45 degrees.

As described above, the inclination angle θ1 of the preceding vehicle T1 shows the same tendency as the normal line inclination angle (90−θt1). That is, in the determination region RNG, the inclination angle θ1 of the preceding vehicle T1 is in a range of a relatively small angle from 0 degrees to 45 degrees. Meanwhile, the inclination angle θ2 of the roadside structure T2 shows the same tendency as the tangent inclination angle θt1. That is, in the determination region RNG, the inclination angle θ2 of the roadside structure T2 is in a range of a relatively large angle from 45 degrees to 90 degrees. Accordingly, determination as to whether or not the object is the preceding vehicle T1 (monitoring target) can be performed based on whether the inclination angle θ of the object is relatively small or large.

Hereinafter, a state where the inclination angle θ of the object is relatively small will be referred to as a "first inclination state". A state where the inclination angle θ of the object is relatively large will be referred to as a "second inclination state". As illustrated in FIG. 4, the first inclination state is a state where the inclination angle θ is less than a first threshold θth1. The second inclination state is a state where the inclination angle θ is greater than a second threshold θth2. The second threshold θth2 is equal to or greater than the first threshold θth1. Typically, the first threshold θth1 is equal to or less than 45 degrees, and the second threshold θth2 is equal to or greater than 45 degrees. The first threshold θth1 and the second threshold θth2 may be equal to each other.

As illustrated in FIG. 4, the inclination state of the preceding vehicle T1 is the first inclination state. Meanwhile, the inclination state of the roadside structure T2 is the second inclination state. Accordingly, determination as to whether or not the object is the preceding vehicle T1 (monitoring target) can be performed by checking whether the inclination state of the object is the first inclination state or the second inclination state.

In FIG. 3 and FIG. 4, the preceding vehicle T1 is used as an example of the monitoring target. A more general monitoring target may be as follows.

The second inclination state where the inclination angle θ of the object is relatively large means that the vehicle 1 can easily pass the side of the object, and that the vehicle 1 has a low possibility of colliding with the object. Meanwhile, the first inclination state where the inclination angle θ of the object is relatively small means that the vehicle 1 may not easily pass the side of the object, and that the vehicle 1 has a possibility of colliding with the object. The "object that may not be easily passed" is an object to which attention has to be paid in order to avoid a collision. Accordingly, according to the embodiment, the "object that may not be easily passed" in the first inclination state is regarded as the monitoring target in the driving assistance control. Meanwhile, the "object that can be easily passed" in the second inclination state is excluded from the monitoring target in the driving assistance control.

In the example illustrated in FIG. 3 and FIG. 4, while the Y direction is used as the reference direction for convenience, the reference direction is not limited to the Y direction. Regardless of the reference direction, the first inclination state that may not be easily passed when seen from the vehicle 1 and the second inclination state that can be easily passed when seen from the vehicle 1 do not change. For example, a "state where the angle (inclination angle θ) formed by the Y direction and the inclination axis AX is relatively 'small'" is equivalent to a "state where the angle formed by the X direction and the inclination axis AX is relatively 'large'", and both states represent the same first inclination state. Thus, determination as to whether or not the inclination state of the object is the first inclination state can be performed by using any of the X direction or the Y direction as the reference direction. The same applies to the second inclination state.

As described above, the driving assistance system according to the embodiment detects the object using the sensor and calculates the inclination direction (inclination axis AX) of the detection surface of the object in the reference coordinate system based on the detection information. Determination as to whether the object is in the first inclination state that may not be easily passed when seen from the vehicle 1, or the second inclination state that can be easily passed when seen from the vehicle 1 can be performed based on the inclination direction. When the object is in the first inclination state, the driving assistance system determines the object as the monitoring target in the driving assistance control. Meanwhile, when the object is in the second inclination state, the driving assistance system excludes the object from the monitoring target.

It is very likely that the inclination state of the roadside structure T2 disposed along the lane boundary LB is the second inclination state that can be easily passed when seen from the vehicle 1. Since the roadside structure T2 is excluded from the monitoring target, unnecessary deceleration (erroneous deceleration) is suppressed in the driving assistance control. Since unnecessary deceleration is suppressed, uncomfortable and anxious feelings of the driver are reduced. Consequently, the reliability of the driving assistance system is further improved.

According to the embodiment, the monitoring target determination process is performed based on the "inclination state of the object". The "positional relationship of the object and the lane boundary LB" does not need to be used unlike the comparative example illustrated in FIG. 2. While the positional relationship of the object and the lane boundary LB is affected by the localization error, the monitoring target determination process according to the embodiment is not affected by the localization error. Accordingly, the accuracy of the monitoring target determination process is further improved. Consequently, unnecessary deceleration is further suppressed in the driving assistance control, and the reliability of the driving assistance system is further improved.

The related art disclosed in JP 2009-288099 A is considered as a second comparative example. In the second comparative example, a horizontal distribution of the reflection intensity of a reflective wave from the object is analyzed in detail, and the number of peaks, the position of each peak, the distribution width, and the like of the reflection intensity are calculated for determination. However, such a method needs a high calculation load and a large amount of calculation time. An increase in calculation load and calculation time causes a delay in driving assistance control, which is not desirable.

Meanwhile, according to the embodiment, the monitoring target determination process is performed based on the "inclination direction of the detection surface of the object". The inclination direction of the detection surface of the object can be simply calculated from the position information of the detection surface of the object acquired by the sensor. The "horizontal distribution of the reflection intensity of the reflective wave from the object" does not need to be analyzed in detail unlike the second comparative example. Only the "position of the detection surface of the object" may be analyzed for calculating the inclination direction of the detection surface of the object. Accordingly, the calculation load and the calculation time required for the monitoring target determination process are reduced. Reduction in the calculation load and the calculation time means improvement in the responsiveness of the driving assistance control, which is desirable.

Hereinafter, a specific example of the configuration and the process of the driving assistance system according to the embodiment will be described in detail.

2. Configuration Example of Driving Assistance System

Figure 5:
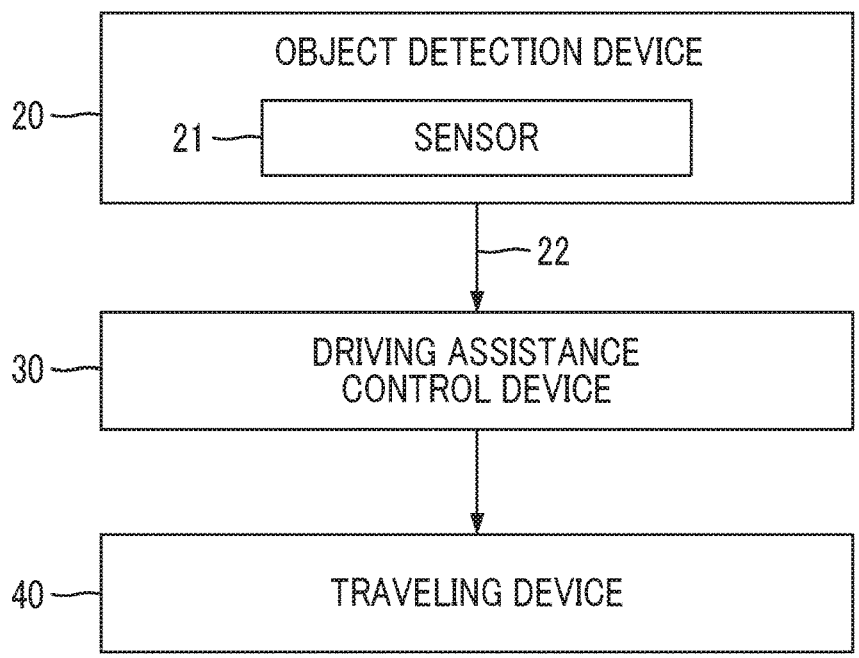
FIG. 5 is a block diagram schematically illustrating a configuration of a driving assistance system according to the embodiment of the disclosure.

FIG. 5 is a block diagram schematically illustrating a configuration of a driving assistance system 10 according to the embodiment. The driving assistance system 10 is mounted in the vehicle 1 and performs the driving assistance control for assisting in driving of the vehicle 1. The driving assistance system 10 includes an object detection device 20, a driving assistance control device 30, and a traveling device 40. The traveling device 40 includes a drive device that drives the vehicle 1, a brake device that applies brake force, and a steering device that steers the vehicle 1.

The object detection device 20 includes a sensor 21 and detects the object in front of the vehicle 1 using the sensor 21. The sensor 21 is exemplified by Laser Imaging Detection and Ranging (LIDAR) or a stereo camera.

The LIDAR radiates pulsed laser light ahead and receives laser light (reflective light) that is reflected on the surface of the object. The distance to the reflection point on the surface of the object can be measured based on the reception timing or a phase delay of the reflective light. The relative position of the reflection point with respect to the vehicle 1 can be calculated based on the radiation direction of the laser and the distance. A plurality of reflection points is distributed in the horizontal direction, and the distance and the relative position of each of the reflection points can be acquired by scanning the laser light in the horizontal direction.

The stereo camera captures an image of the space ahead and detects the surface of the object based on the imaging data. More specifically, the stereo camera captures an image of the space ahead using two right and left cameras, and generates disparity data from the imaging data acquired from each of the cameras. The distance and the relative position can be calculated per pixel based on the disparity data.

Figure 6:
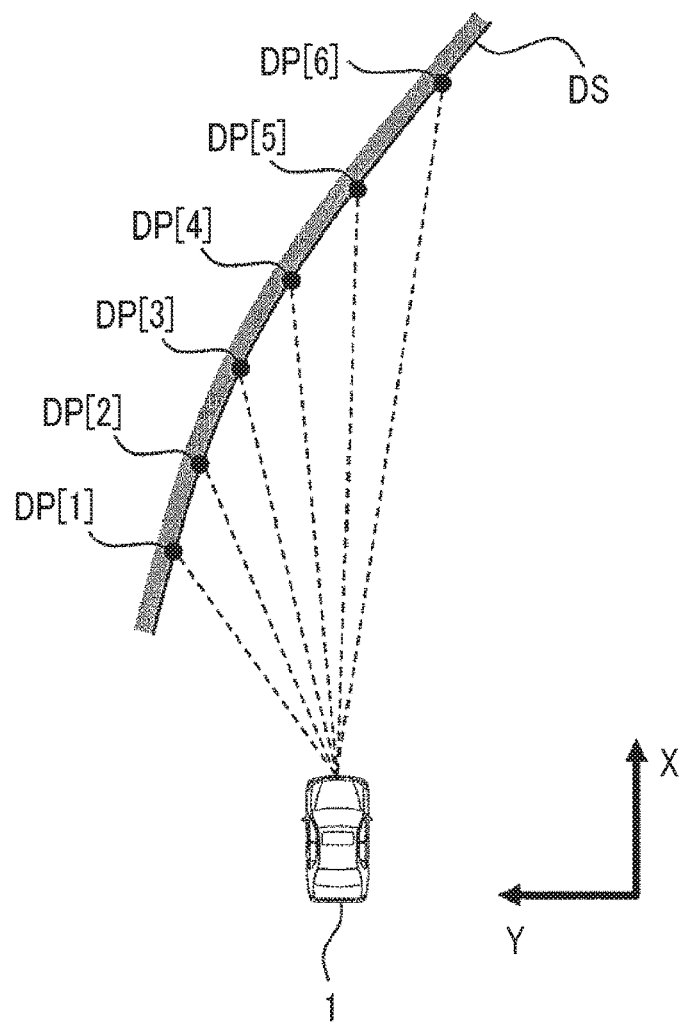
FIG. 6 is a conceptual diagram for describing an object detection process of an object detection device according to the embodiment of the disclosure.

FIG. 6 is a conceptual diagram for describing an object detection process of the object detection device 20. The surface of the object detected by the sensor 21 is a detection surface DS. Typically, the object is detected at a plurality of detection points DP (DP[1] to DP[6]) on the detection surface DS. For example, in the case of the LIDAR, the detection point DP is the reflection point of the laser light. In the case of the stereo camera, the detection point DP is a pixel representing the surface of the object. The detection points DP related to the same object are recognized as one cluster by performing a well-known clustering process.

The object detection device 20 acquires object detection information 22 from the object detection result of the sensor 21. The object detection information 22 indicates the relative position of the detection surface DS of the object with respect to the vehicle 1. When the object is detected at the detection points DP, the object detection information 22 includes the relative position of each of the detection points DP. The object detection information 22 may include brightness information of each detection point DP. The object detection device 20 sends the acquired object detection information 22 to the driving assistance control device 30.

The driving assistance control device 30 performs the driving assistance control based on the object detection information 22. The driving assistance control device 30 is implemented using an electronic control unit (ECU). The ECU is a microcomputer that includes a processor, a storage device, and an input and output interface. Various data processes are implemented by executing a program stored in the storage device using the processor.

The driving assistance control device 30 performs at least one of the following traveling control or the collision avoidance control as the driving assistance control.

The following traveling control is a control for following the monitoring target (preceding vehicle T1) while maintaining the set inter-vehicle distance. The driving assistance control device 30 performs the following traveling control by controlling the traveling device 40. When the inter-vehicle distance to the monitoring target is less than the set value, the driving assistance control device 30 automatically operates the brake device of the traveling device 40 to decelerate the vehicle 1.

The collision avoidance control is a control for avoiding a collision with the monitoring target. When the driving assistance control device 30 determines that the possibility of colliding with the monitoring target is high, the driving assistance control device 30 automatically operates the brake device of the traveling device 40 to decelerate the vehicle 1.

The driving assistance control device 30 determines whether or not the object indicated by the object detection information 22 is the monitoring target. When the object is the monitoring target, the driving assistance control device 30 performs the following traveling control or the collision avoidance control for the monitoring target. In any case of the following traveling control and the collision avoidance control, determination as to whether or not the object is the monitoring target needs to be correctly performed in order to suppress erroneous deceleration.

Hereinafter, the functional configuration and the process of the driving assistance control device 30 according to the embodiment will be described in further detail.

3. Driving Assistance Control Device 30

Figure 7:
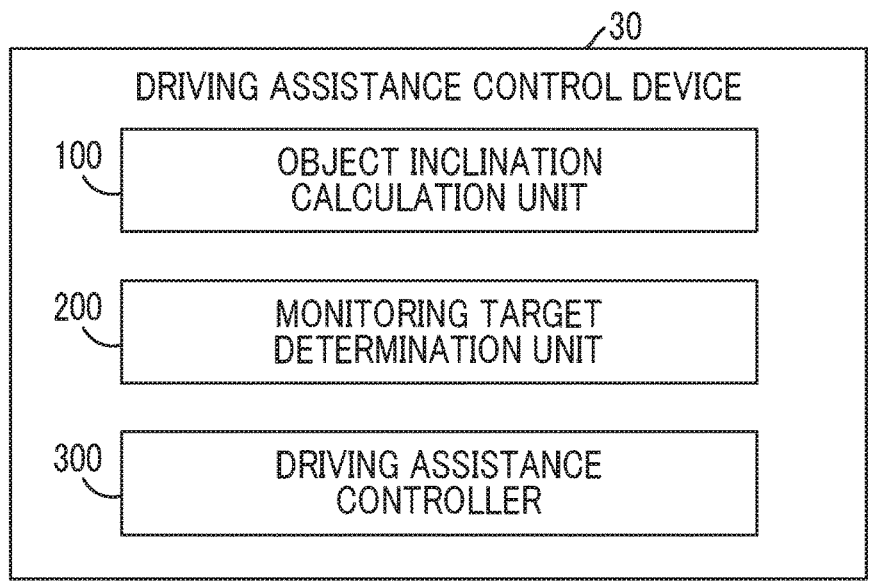
FIG. 7 is a block diagram illustrating a functional configuration of a driving assistance control device according to the embodiment of the disclosure.

FIG. 7 is a block diagram illustrating the functional configuration of the driving assistance control device 30 according to the embodiment. The driving assistance control device 30 includes an object inclination calculation unit 100, a monitoring target determination unit 200, and a driving assistance controller 300 as a function block. Each function block is implemented by executing the program stored in the storage device using the processor of the ECU. Hereinafter, the process of each function block will be described in detail.

3-1. Object Inclination Calculation Unit 100

The object inclination calculation unit 100 calculates the inclination direction of the detection surface DS of the object detected by the object detection device 20.

Figure 8:
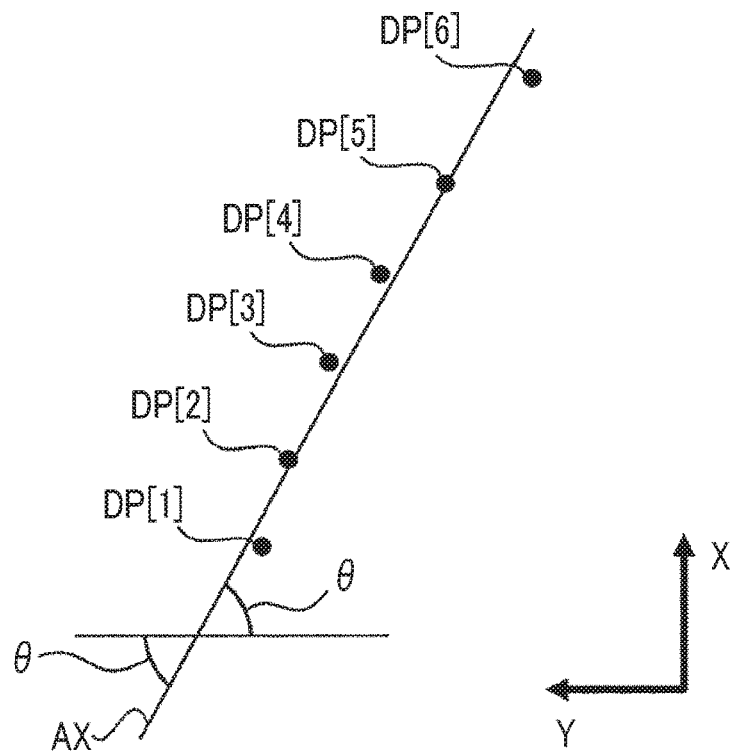
FIG. 8 is a conceptual diagram for describing an object inclination calculation process of the driving assistance control device according to the embodiment of the disclosure.

FIG. 8 is a conceptual diagram for describing an object inclination calculation process of the object inclination calculation unit 100. The inclination direction of the detection surface DS of the object is represented by the inclination axis AX or the inclination angle θ in the reference coordinate system. The inclination axis AX is a representative straight line that represents the inclination direction of the detection surface DS of the object. The inclination angle θ is an angle (0 degrees to 90 degrees) formed by the inclination axis AX and the reference direction in the reference coordinate system. The reference direction is, for example, the Y direction (the lateral direction of the vehicle 1).

The object inclination calculation unit 100 calculates the inclination axis AX and the inclination angle θ based on the object detection information 22. Specifically, the object detection information 22 includes the relative position of each of the detection points DP (DP[1] to DP[6]) on the detection surface DS of the object. The object inclination calculation unit 100 calculates the inclination axis AX from the positional relationship of the detection points DP in the reference coordinate system.

As an example, the object inclination calculation unit 100 performs principal component analysis for the position of each of the detection points DP in the reference coordinate system. The principal axis calculated by the principal component analysis is the inclination axis AX. That is, the object inclination calculation unit 100 performs principal component analysis for the detection points DP and calculates the principal axis as the inclination axis AX.

As another example, the object inclination calculation unit 100 selects two representative detection points from the detection points DP and calculates a line connecting the two representative detection points as the inclination axis AX. For example, two end points (in the example illustrated in FIG. 8, DP[1] and DP[6]) among the detection points DP are selected as the representative detection points. Alternatively, a point at the minimum distance from the vehicle 1 and a point at the maximum distance from the vehicle 1 are selected as the representative detection points.

As another example, the object inclination calculation unit 100 may perform fitting (regression analysis) for the detection points DP using a linear function. The linear function decided by the fitting is the inclination axis AX.

As described above, the inclination direction (the inclination axis AX and the inclination angle θ) of the detection surface DS of the object can be simply calculated from the positional relationship of the detection points DP in the reference coordinate system.

Figure 9:
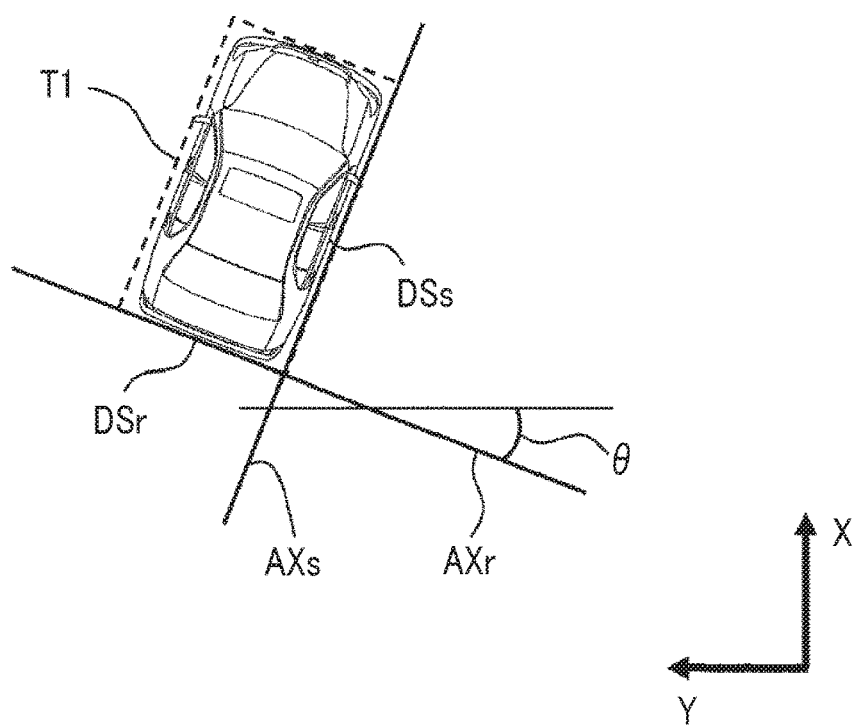
FIG. 9 is a conceptual diagram for describing the object inclination calculation process of the driving assistance control device according to the embodiment of the disclosure.

As illustrated in FIG. 9, when the preceding vehicle T1 is detected by the sensor 21, there is a possibility of detecting not only a rear surface DSr but also a side surface DS s of the preceding vehicle T1. In this case, an inclination axis AXr of the rear surface DSr has to be calculated instead of an inclination axis Axs of the side surface DSs. Thus, a reflector (reflective plate) that is generally attached on the rear surface DSr is focused on here. The reflection intensity of light from the reflector is high, and the brightness in the position of the reflector is high. Thus, the object inclination calculation unit 100 references the brightness information included in the object detection information 22 and specifies the detection surface DS having the maximum brightness as the rear surface DSr. The object inclination calculation unit 100 calculates the inclination axis Axr of the rear surface DSr as the inclination axis AX.

3-2. Monitoring Target Determination Unit 200

The monitoring target determination unit 200 performs the monitoring target determination process for determining whether or not the object is the monitoring target. Hereinafter, various examples of the monitoring target determination process of the monitoring target determination unit 200 will be described.

3-2-1. First Example

Figure 10:
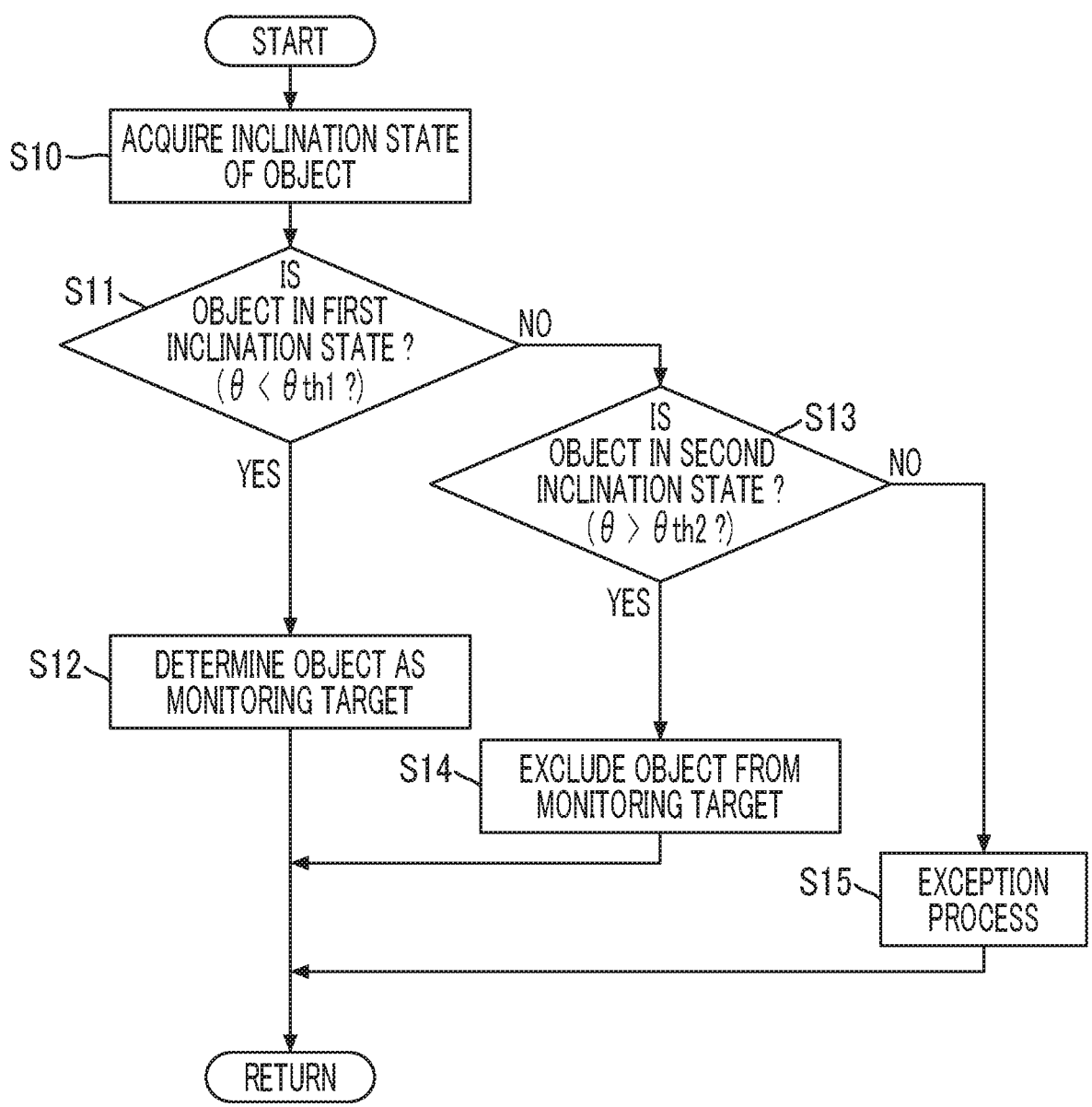
FIG. 10 is a flowchart illustrating a first example of the monitoring target determination process of the driving assistance control device according to the embodiment of the disclosure.

FIG. 10 is a flowchart illustrating a first example of the monitoring target determination process. The process flow illustrated in FIG. 10 is repeatedly performed at a certain cycle.

Step S10: First, the monitoring target determination unit 200 acquires information that indicates the inclination state of the object. For example, the information indicating the inclination state of the object is the inclination angle θ calculated by the object inclination calculation unit 100.

Step S11: The monitoring target determination unit 200 determines whether or not the object is in the first inclination state. For example, as illustrated in FIG. 4, the first inclination state is defined as a state where the inclination angle θ is less than the first threshold θth1. Thus, the monitoring target determination unit 200 can determine whether or not the object is in the first inclination state by comparing the inclination angle $\theta$ with the first threshold $\theta\text{th}1$. When the object is in the first inclination state (YES in step S11), the process proceeds to step S12. When the object is not in the first inclination state (NO in step S11), the process proceeds to step S13.

Step S12: As described above, the first inclination state where the inclination angle $\theta$ of the object is relatively small means that the vehicle 1 may not easily pass the side of the object, and that the vehicle 1 has a possibility of colliding with the object. The "object that may not be easily passed" is an object to which attention has to be paid in order to avoid a collision. Accordingly, the monitoring target determination unit 200 determines the object in the first inclination state as the monitoring target in the driving assistance control.

Step S13: The monitoring target determination unit 200 determines whether or not the object is in the second inclination state. For example, as illustrated in FIG. 4, the second inclination state is defined as a state where the inclination angle $\theta$ is greater than the second threshold $\theta\text{th}2$. Thus, the monitoring target determination unit 200 can determine whether or not the object is in the second inclination state by comparing the inclination angle $\theta$ with the second threshold $\theta\text{th}2$. When the object is in the second inclination state (YES in step S13), the process proceeds to step S14. When the object is not in the second inclination state (NO in step S13), the process proceeds to step S15.

Step S14: As described above, the second inclination state where the inclination angle $\theta$ of the object is relatively large means that the vehicle 1 can easily pass the side of the object, and that the vehicle 1 has a low possibility of colliding with the object. Accordingly, the monitoring target determination unit 200 excludes the object in the second inclination state from the monitoring target in the driving assistance control.

Step S15: when the object is neither in the first inclination state nor in the second inclination state, the monitoring target determination unit 200 performs an exception process. Details of the exception process depend on design. For example, the monitoring target determination unit 200 may suspend the determination as to whether or not the object is the monitoring target. Alternatively, the monitoring target determination unit 200 may determine the object as the monitoring target by prioritizing safety.

3-2-2. Second Example

In a second example, a case where a curved lane is present in front of the vehicle 1, that is, a case where the lane boundary LB is curved, is particularly considered. When the lane boundary LB is curved, the "determination region RNG" illustrated in FIG. 4 can be defined.

More specifically, as illustrated in FIG. 3 and FIG. 4, when the lane boundary LB is curved, the tangent inclination angle $\theta\text{t}1$ of the lane boundary LB is decreased from 90 degrees as the distance from the vehicle 1 is increased. Meanwhile, the normal line inclination angle $(90-\theta\text{t}1)$ is increased from 0 degrees as the distance from the vehicle 1 is increased. The X position at which both of the tangent inclination angle $\theta\text{t}1$ and the normal line inclination angle $(90-\theta\text{t}1)$ are equal to 45 degrees is the limit position Xlim. The region from the vehicle 1 to the limit position Xlim is the determination region RNG.

When the lane boundary LB is curved, the monitoring target determination process in the first example is effective in the determination region RNG. Thus, in the second example, the monitoring target determination unit 200 performs the monitoring target determination process while sequentially recognizing the determination region RNG.

Figure 11:
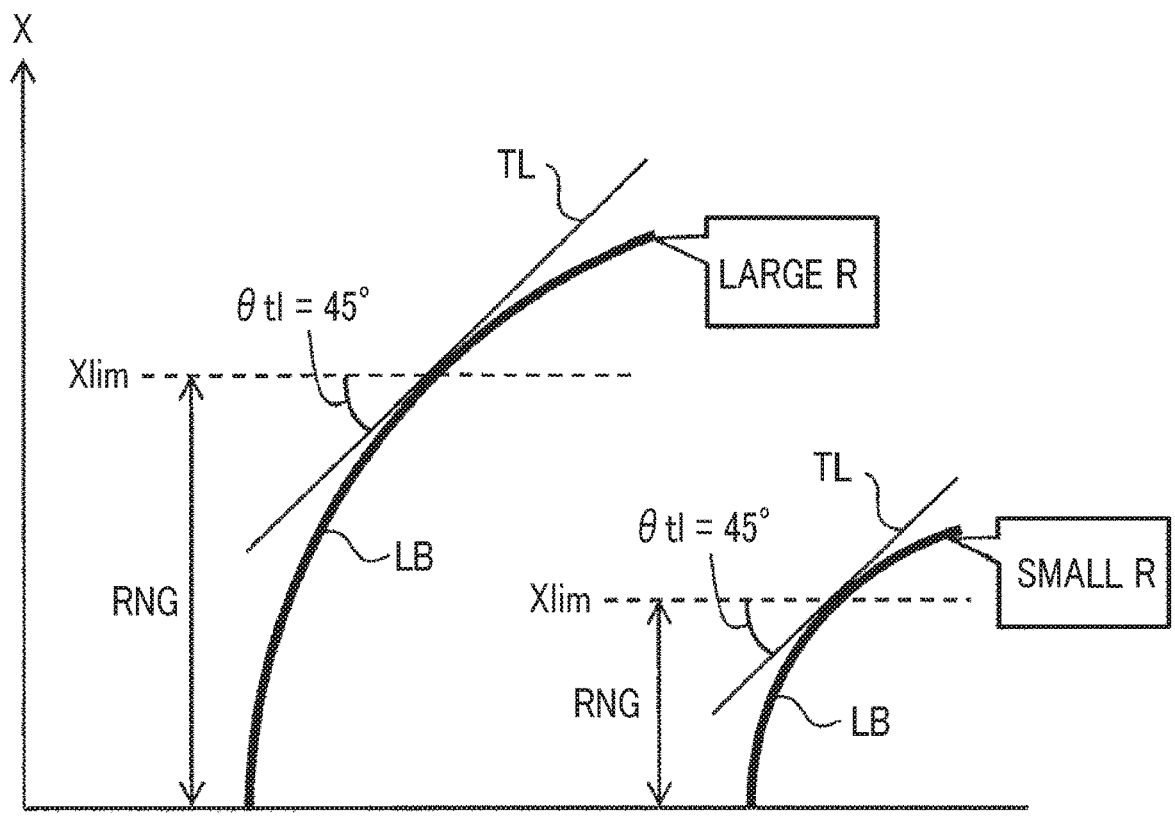
FIG. 11 is a conceptual diagram for describing a second example of the monitoring target determination process of the driving assistance control device according to the embodiment of the disclosure.

FIG. 11 illustrates a relationship of the determination region RNG and a radius of curvature R of the lane boundary LB. The determination region RNG varies according to the radius of curvature R of the lane boundary LB. Specifically, as the radius of curvature R is increased, the determination region RNG is increased. As the radius of curvature R is decreased, the determination region RNG is decreased. For example, when the radius of curvature R is 1,000 m, the limit position Xlim is a position approximately 700 m in front of the vehicle 1. When the radius of curvature R is 500 m, the limit position Xlim is a position approximately 350 m in front of the vehicle 1. When the radius of curvature R is 100 m, the limit position Xlim is a position approximately 70 m in front of the vehicle 1.

The measurable distance of the sensor 21 is a few hundred meters in reality. Thus, when the radius of curvature R is large, the determination region RNG substantially does not pose a problem. Accordingly, the determination region RNG may be considered only when the radius of curvature R is small.

Figure 12:
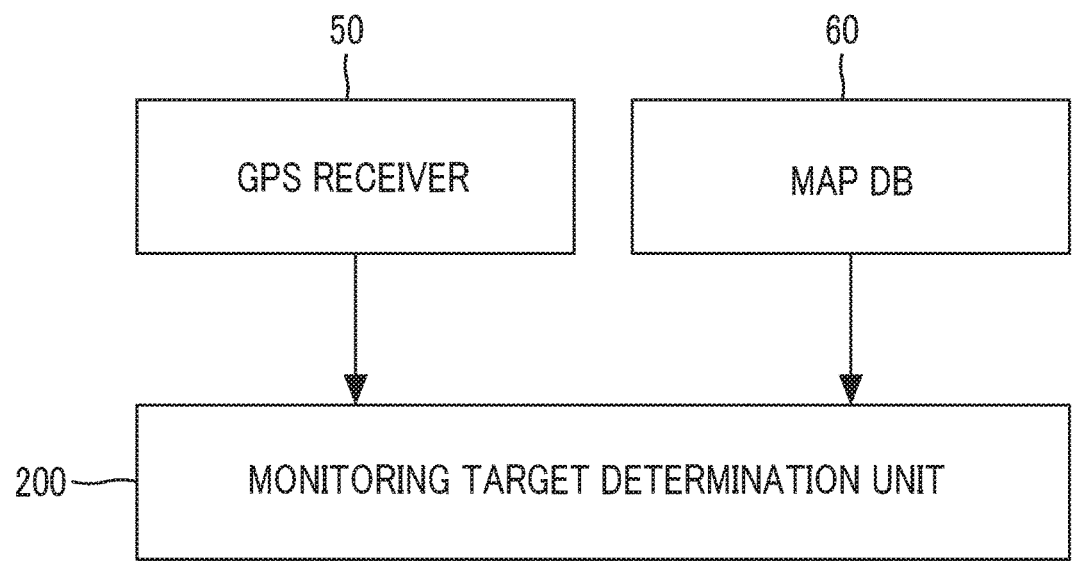
FIG. 12 is a block diagram for describing the second example of the monitoring target determination process of the driving assistance control device according to the embodiment of the disclosure.

FIG. 12 is a block diagram for describing the second example of the monitoring target determination process. In the second example, a GPS receiver 50 and a map database 60 are used.

The GPS receiver 50 receives signals transmitted from a plurality of GPS satellites and calculates the position (the latitude and the longitude) and the azimuth of the vehicle 1 based on the received signals. The GPS receiver 50 sends position-and-azimuth information indicating the calculated position and the calculated azimuth to the monitoring target determination unit 200.

Information that indicates the position (the latitude and the longitude) of the lane boundary LB on the map is recorded in advance in the map database 60. The position of the lane boundary LB is represented by a set of a plurality of points (point group) or a set of a plurality of lines (line group). The map database 60 is stored in a predetermined storage device.

The monitoring target determination unit 200 receives the position-and-azimuth information from the GPS receiver 50. The monitoring target determination unit 200 acquires the position information of the lane boundary LB in front of the vehicle 1 from the map database 60 based on the position-and-azimuth information. The monitoring target determination unit 200 calculates the determination region RNG where the tangent inclination angle $\theta\text{t}1$ is in a range of 45 degrees to 90 degrees, from the position information of the lane boundary LB in the reference coordinate system.

The monitoring target determination unit 200 performs the monitoring target determination process using the determination region RNG as a limit. That is, the monitoring target determination unit 200 determines whether or not the object present within the determination region RNG is the monitoring target. As described above, when the lane boundary LB is curved, the accuracy of the monitoring target determination process is further improved by considering the determination region RNG that is suitable for determination.

3-2-3. Third Example

A third example is a modification example of the monitoring target determination process in the first example illustrated in FIG. 4. Specifically, a "temporal change of the inclination state of the object" is considered in the third example.

Figure 13:
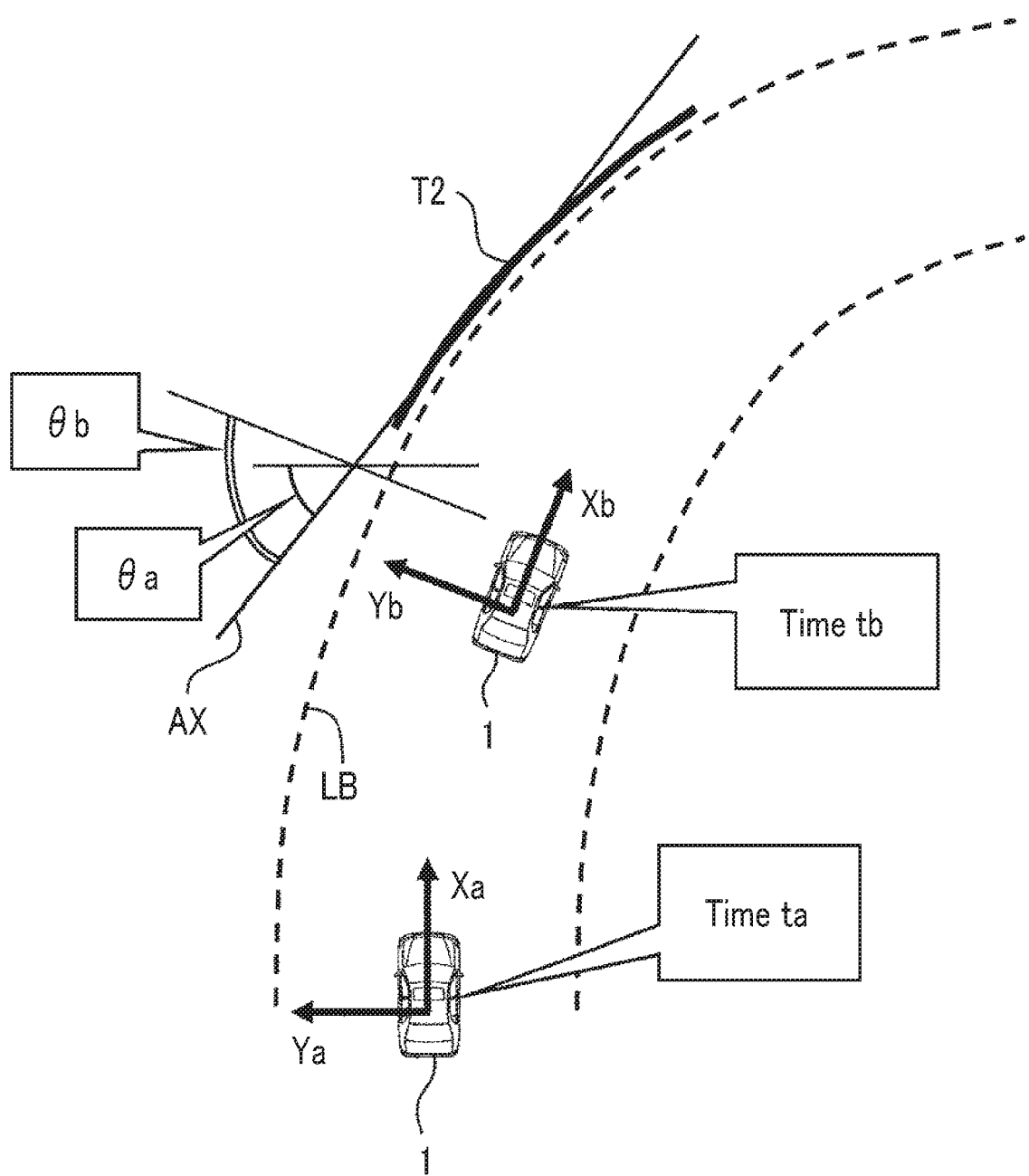
FIG. 13 is a conceptual diagram for describing a third example of the monitoring target determination process of the driving assistance control device according to the embodiment of the disclosure.

As an example, a situation illustrated in FIG. 13 is considered. In FIG. 13, the vehicle 1 is traveling along a curved lane, and the roadside structure T2 is present on the roadside in the middle of the curve lane. The way the roadside structure T2 looks as seen from the vehicle 1 is changed as the vehicle 1 advances. That is, as the vehicle 1 advances, the inclination angle θ of the roadside structure T2 in the reference coordinate system is changed.

Specifically, at time ta, the reference coordinate system is represented by (Xa, Ya). In the reference coordinate system (Xa, Ya), the inclination angle of the roadside structure T2 is denoted by θa. At time tb after time ta, the reference coordinate system is represented by (Xb, Yb). In the reference coordinate system (Xb, Yb), the inclination angle of the roadside structure T2 is denoted by θb that is greater than θa. That is, as time elapses, the inclination angle θ of the roadside structure T2 is increased.

Figure 14:
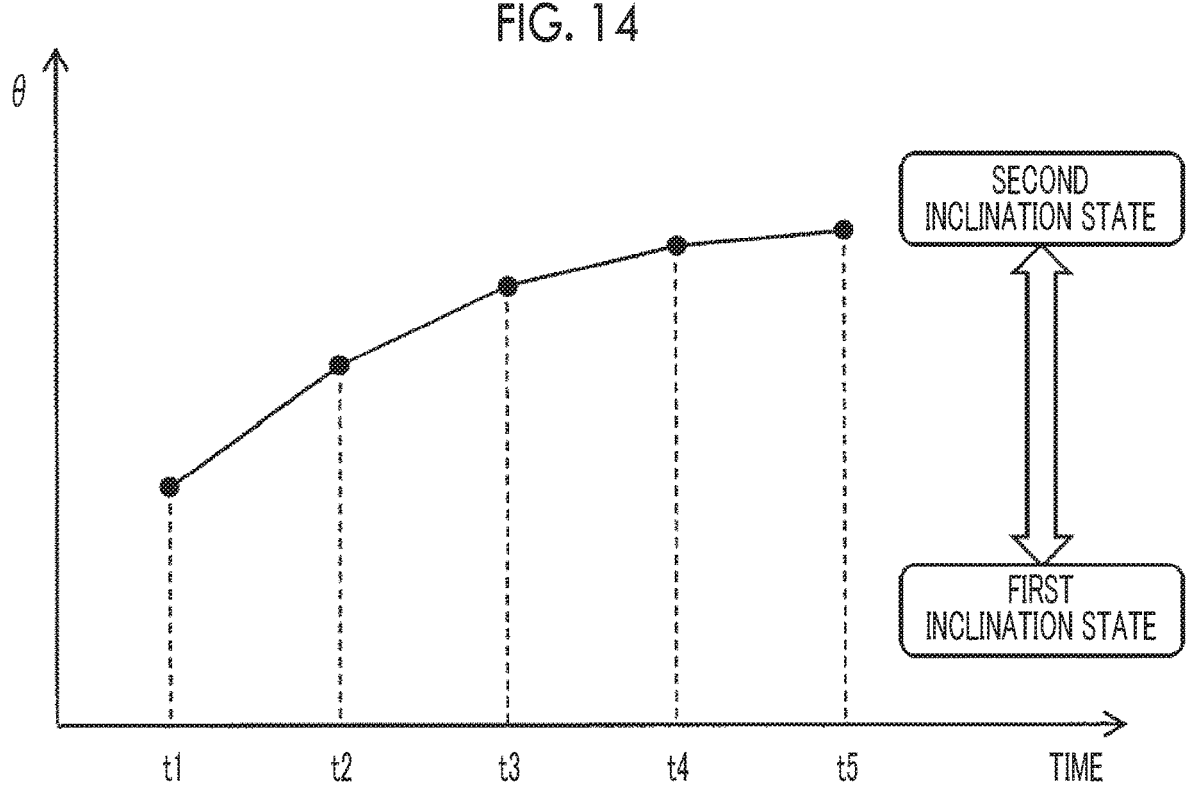
FIG. 14 is a graph for describing the third example of the monitoring target determination process of the driving assistance control device according to the embodiment of the disclosure.

FIG. 14 illustrates an inclination change tendency in the situation illustrated in FIG. 13. The inclination angle θ of the object tends to be increased along with the elapse of time. In other words, the inclination state of the object tends to be changed in a direction toward the second inclination state side from the first inclination state side along with the elapse of time. The inclination change tendency means that the possibility of the vehicle 1 colliding with the object is gradually decreased. Accordingly, it is considered that the object that shows such an inclination change tendency may be excluded from the monitoring target.

Figure 15:
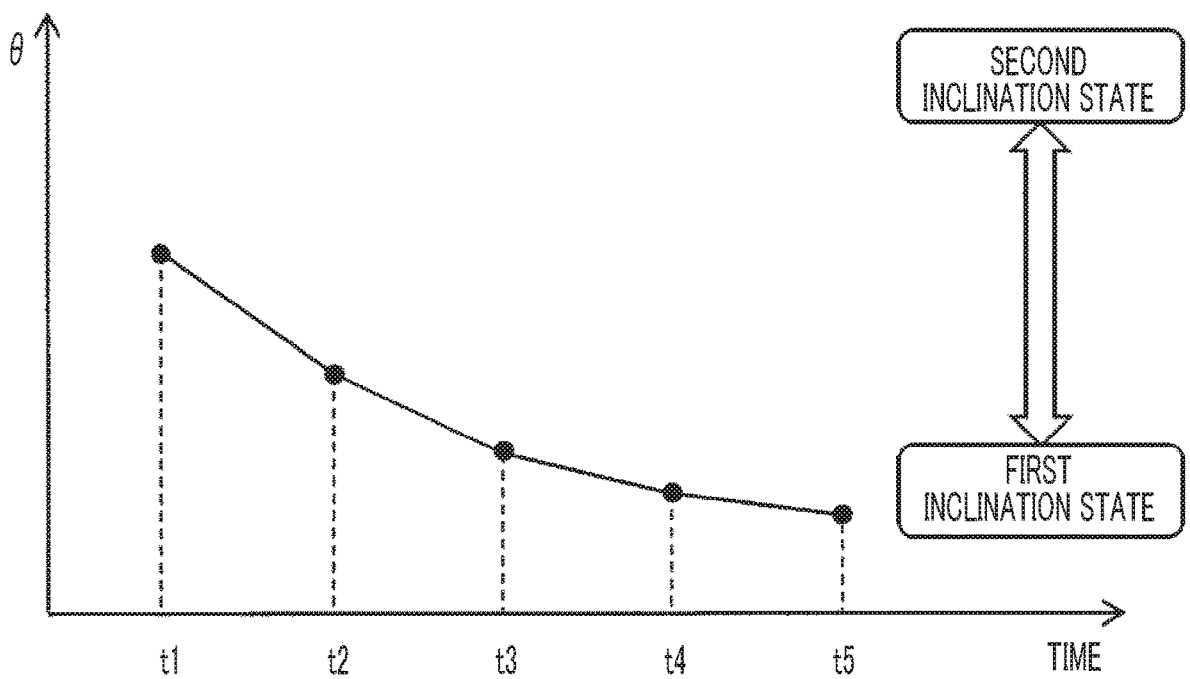
FIG. 15 is a graph for describing the third example of the monitoring target determination process of the driving assistance control device according to the embodiment of the disclosure.

FIG. 15 illustrates an inclination change tendency that is opposite to that in FIG. 14. The inclination angle θ of the object tends to be decreased along with the elapse of time. In other words, the inclination state of the object tends to be changed in a direction toward the first inclination state side from the second inclination state side along with the elapse of time. The inclination change tendency means that the possibility of the vehicle 1 colliding with the object is gradually increased. Accordingly, it is reasonable that the object that shows such an inclination change tendency is regarded as the monitoring target.

Figure 16:
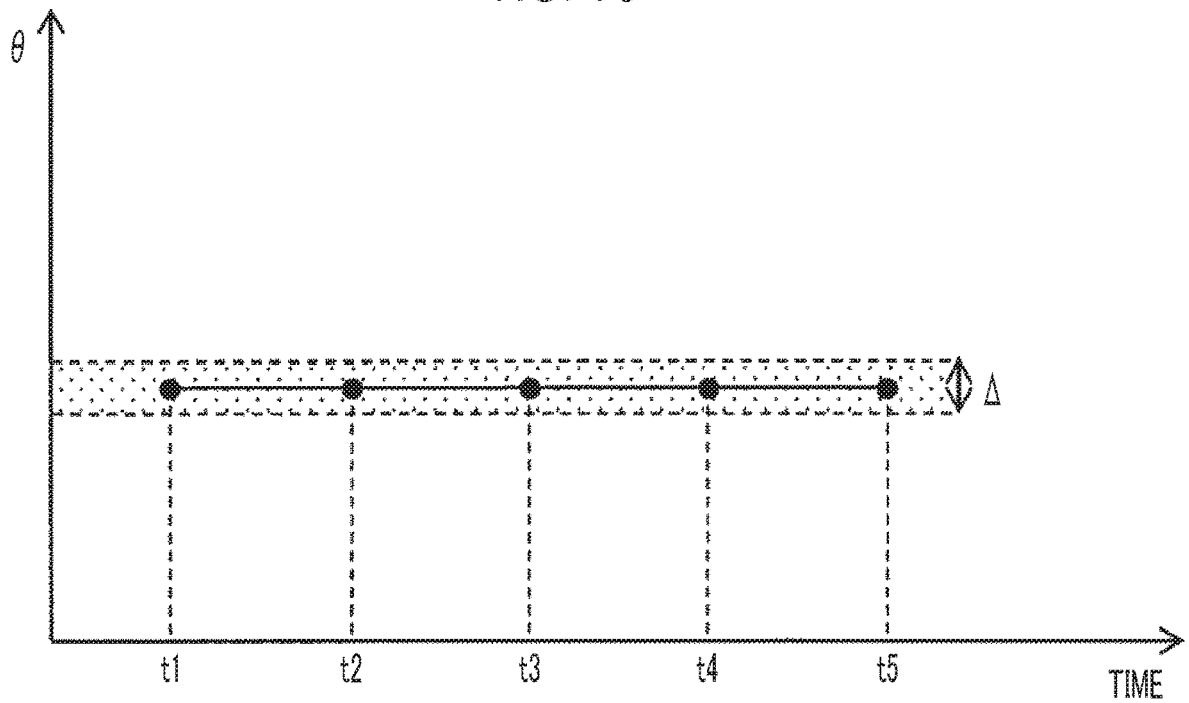
FIG. 16 is a graph for describing the third example of the monitoring target determination process of the driving assistance control device according to the embodiment of the disclosure.

FIG. 16 illustrates an inclination change tendency when the vehicle 1 is following the preceding vehicle T1. When the vehicle 1 is following the preceding vehicle T1, it is considered that the inclination angle θ of the preceding vehicle T1 is maintained to be almost constant even when time elapses. In other words, when the inclination state of the object is maintained to be constant without change, it is highly likely that the object is the preceding vehicle T1. Accordingly, it is reasonable that the object that shows such an inclination change tendency is regarded as the monitoring target. The constant inclination angle θ (inclination state) means that the inclination angle θ is maintained within a minute range Δ.

The third example is based on the viewpoints described thus far. That is, the monitoring target determination unit 200 determines whether or not the object is the monitoring target based on a "history of the inclination state of the object". Hereinafter, the monitoring target determination process that is based on such a history will be referred to as a "history determination process".

Figure 17:
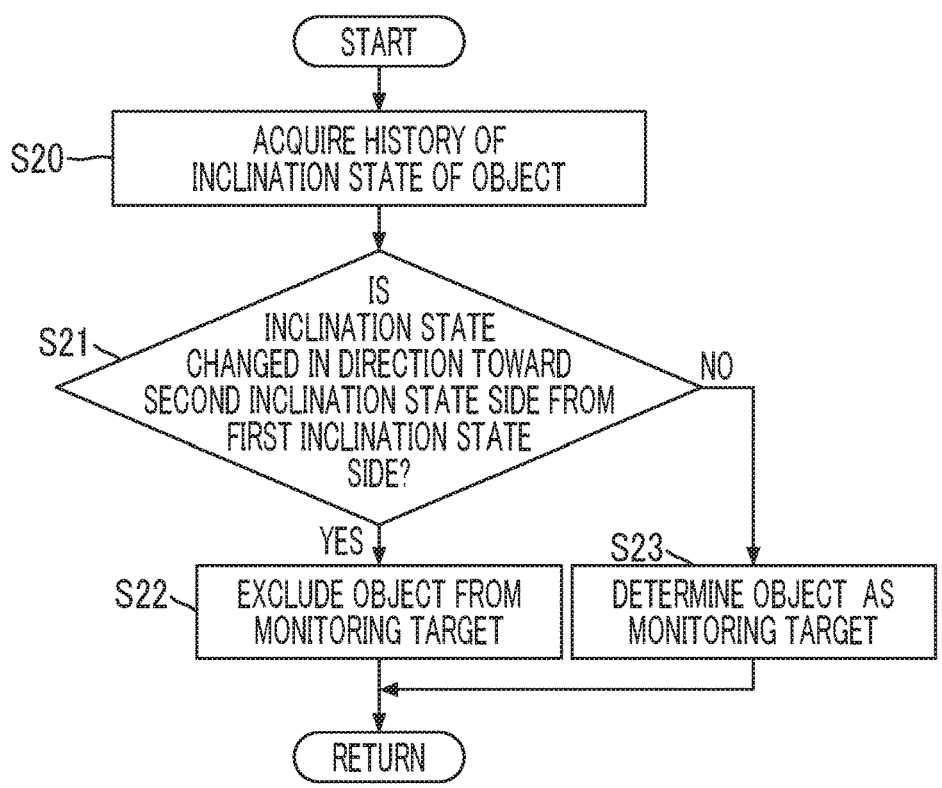
FIG. 17 is a flowchart illustrating the third example of the monitoring target determination process of the driving assistance control device according to the embodiment of the disclosure.

FIG. 17 is a flowchart illustrating the history determination process according to the third example. The process flow illustrated in FIG. 17 is repeatedly performed at a certain cycle.

Step S20: The monitoring target determination unit 200 acquires information that indicates the history of the inclination state of the object. For example, the information indicating the history of the inclination state of the object is a history of the inclination angle θ calculated by the object inclination calculation unit 100. Each time the inclination angle θ is calculated, the object inclination calculation unit 100 stores the calculated inclination angle θ in association with the object in the predetermined storage device. The monitoring target determination unit 200 reads the history of the inclination angle θ associated with the object under determination from the predetermined storage device.

Step S21: The monitoring target determination unit 200 determines whether or not the inclination state of the object tends to be changed in a direction toward the second inclination state side from the first inclination state side along with the elapse of time. When the inclination state of the object is changed in a direction toward the second inclination state side from the first inclination state side (YES in step S21), the process proceeds to step S22. When the inclination state of the object is not changed in a direction toward the second inclination state side from the first inclination state side (NO in step S21), the process proceeds to step S23.

Step S22: The inclination state of the object tends to be changed in a direction toward the second inclination state side from the first inclination state side along with the elapse of time (refer to FIG. 14). The inclination change tendency means that the possibility of the vehicle 1 colliding with the object is gradually decreased. Accordingly, the monitoring target determination unit 200 excludes the object from the monitoring target.

Step S23: The inclination state of the object tends to be changed in a direction toward the first inclination state side from the second inclination state side along with the elapse of time (refer to FIG. 15). The inclination change tendency means that the possibility of the vehicle 1 colliding with the object is gradually increased. Alternatively, the inclination state of the object is maintained to be constant without change along with the elapse of time (refer to FIG. 16). In this case, it is highly likely that the object is the preceding vehicle T1. Accordingly, the monitoring target determination unit 200 determines the object as the monitoring target.

As described above, according to the third example, a temporal change (history) of the inclination state of the object is considered in the monitoring target determination process. The monitoring target determination process can be performed with higher accuracy by considering such a temporal change of the inclination state.

3-2-4. Fourth Example

A fourth example is a combination of the monitoring target determination process according to the first example or the second example and the monitoring target determination process (history determination process) according to the third example.

For example, the monitoring target determination unit 200 first performs the monitoring target determination process according to the first example or the second example. Then, along with the elapse of time, the monitoring target determination unit 200 additionally performs the history determination process according to the third example. When the determination results of the monitoring target determination process and the history determination process are different from each other, the monitoring target determination unit 200 prioritizes the determination result of the history determination process according to the third example. Combining the two types of monitoring target determination processes further improves the accuracy of determination.

The monitoring target determination unit 200 may decide whether or not to additionally perform the history determination process according to the distance to the object. When the object is still present at a distance, the object does not need to be immediately avoided, and there is an enough amount of time for determination. Accordingly, when the distance to the object is equal to or greater than a certain value, the monitoring target determination unit 200 may improve the accuracy of determination by starting the history determination process.

As another example, the monitoring target determination unit 200 may appropriately perform the two types of monitoring target determination processes according to the accuracy of the object detection information 22. For example, when the horizontal width of the object is small, the detection surface DS is narrow, and it is likely that the number of detection points DP is small. When the number of detection points DP is small, the accuracy of calculating the inclination axis AX and the inclination angle θ is decreased. In this case, it is desirable to focus on the temporal change tendency of the inclination angle θ rather than the inclination angle θ itself. Thus, when the accuracy of the object detection information 22 is lower than an allowed range, the monitoring target determination unit 200 performs the history determination process according to the third example. Accordingly, a decrease in the accuracy of determination can be suppressed.

3-3. Driving Assistance Controller 300

The driving assistance controller 300 performs the driving assistance control for the object that is determined as the monitoring target by the monitoring target determination unit 200. The driving assistance control includes at least one of the following traveling control or the collision avoidance control. In the following traveling control, the driving assistance controller 300 controls the traveling device 40 to cause the vehicle 1 to follow the monitoring target. In the collision avoidance control, the driving assistance controller 300 controls the traveling device 40 to avoid a collision with the monitoring target.

In the collision avoidance control, it is also considered that a traveling plan is changed according to the inclination state of the object. Specifically, when the inclination state is the first inclination state that may not be easily passed, the driving assistance controller 300 may perform speed planning that assumes avoidance based on deceleration. When the inclination state is the second inclination state that can be easily passed, the driving assistance controller 300 may perform steering planning that assumes avoidance based on steering without deceleration.

As described thus far, according to the embodiment, the monitoring target that is an event where deceleration has to be performed can be appropriately recognized. Thus, unnecessary deceleration (erroneous deceleration) is suppressed. Since unnecessary deceleration is suppressed, uncomfortable and anxious feelings of the driver are reduced. Consequently, the reliability of the driving assistance system is further improved.

What is claimed is:

1. A driving assistance system mounted in a vehicle, the driving assistance system comprising:
    an object detection device configured to detect, by using a sensor, an object in front of the vehicle and to acquire object detection information that indicates a relative position of a detection surface of the object with respect to the vehicle; and
    a driving assistance control device configured to determine whether or not the object is a monitoring target and to perform a control for avoiding a collision with the monitoring target or a control for following the monitoring target, wherein
    the driving assistance control device is configured to calculate, based on the object detection information, an inclination direction of the detection surface of the object in a reference coordinate system in a horizontal plane, the reference coordinate system being fixed with respect to the vehicle
    a first inclination state is a state where an angle formed by the inclination direction and a lateral direction of the vehicle is less than a first threshold
    a second inclination state is a state where the angle is greater than a second threshold that is equal to or greater than the first threshold and
    the driving assistance control device is configured to determine the object in the first inclination state as the monitoring target and to exclude the object in the second inclination state from the monitoring target, wherein:
    an angle defined by a direction of a tangent of a lane boundary and the lateral direction of the vehicle in the reference coordinate system is a tangent inclination angle;
    a region where the tangent inclination angle is in a range of 45 degrees to 90 degrees is a determination region when the lane boundary is curved in front of the vehicle; and
    the driving assistance control device is configured to determine whether or not the object present within the determination region is the monitoring target.

2. The driving assistance system according to claim 1, wherein:
    the object is detected by the sensor at a plurality of detection points on the detection surface;
    the object detection information includes a relative position of each of the detection points; and
    the driving assistance control device is configured to calculate the inclination direction from a positional relationship of the detection points in the reference coordinate system.

3. The driving assistance system according to claim 1, wherein:
    the driving assistance control device is configured to perform a history determination process based on a history of an inclination state of the object; and
    the driving assistance control device is configured to exclude the object from the monitoring target when the inclination state of the object tends to be changed in a direction toward the second inclination state from the first inclination state along with an elapse of time.

4. The driving assistance system according to claim 3, wherein
    the driving assistance control device is configured to perform the history determination process when accuracy of the object detection information is lower than an allowed range.

5. The driving assistance system according to claim 1, wherein:
    the driving assistance control device is configured to perform a history determination process based on a history of an inclination state of the object; and the driving assistance control device is configured to determine the object as the monitoring target when the inclination state of the object tends to be changed in a direction toward the first inclination state from the second inclination state along with an elapse of time.

6. A driving assistance system mounted in a vehicle, the driving assistance system comprising:
an object detection device configured to detect, by using a sensor, an object in front of the vehicle and to acquire object detection information that indicates a relative position of a detection surface of the object with respect to the vehicle; and
a driving assistance control device configured to determine whether or not the object is a monitoring target and to perform a control for avoiding a collision with the monitoring target or a control for following the monitoring target, wherein
the driving assistance control device is configured to calculate, based on the object detection information, an inclination direction of the detection surface of the object in a reference coordinate system in a horizontal plane, the reference coordinate system being fixed with respect to the vehicle
a first inclination state is a state where an angle formed by the inclination direction and a lateral direction of the vehicle is less than a first threshold
a second inclination state is a state where the angle is greater than a second threshold that is equal to or greater than the first threshold and
the driving assistance control device is configured to determine the object in the first inclination state as the monitoring target and to exclude the object in the second inclination state from the monitoring target, wherein:
the driving assistance control device is configured to perform a history determination process based on a history of an inclination state of the object; and
the driving assistance control device is configured to determine the object as the monitoring target when the inclination state of the object is maintained to be constant along with an elapse of time.

7. A driving assistance system that is mounted in a vehicle, the driving assistance system comprising:
an object detection device configured to detect, using a sensor, an object in front of the vehicle and to acquire object detection information that indicates a relative position of a detection surface of the object with respect to the vehicle; and
a driving assistance control device configured to determine whether or not the object is a monitoring target and to perform a control for avoiding a collision with the monitoring target or a control for following the monitoring target, wherein
the driving assistance control device is configured to calculate, based on the object detection information, an inclination direction of the detection surface of the object in a reference coordinate system in a horizontal plane, the reference coordinate system being fixed with respect to the vehicle
a first inclination state is a state where an angle defined by the inclination direction and a lateral direction of the vehicle is less than a first threshold
a second inclination state is a state where the angle is greater than a second threshold that is equal to or greater than the first threshold
the driving assistance control device is configured to determine the object as the monitoring target when an inclination state of the object tends to be changed in a direction toward the first inclination state from the second inclination state along with an elapse of time and
the driving assistance control device is configured to exclude the object from the monitoring target when the inclination state of the object tends to be changed in a direction toward the second inclination state from the first inclination state along with the elapse of time.

8. The driving assistance system according to claim 7, wherein the driving assistance control device is configured to perform a history determination process based on a history of an inclination state of the object.

9. The driving assistance system according to claim 7, wherein the driving assistance control device is configured to perform a history determination process when accuracy of the object detection information is lower than an allowed range.

10. The driving assistance system according to claim 7, wherein:
the object is detected by the sensor at a plurality of detection points on the detection surface;
the object detection information includes a relative position of each of the detection points; and
the driving assistance control device is configured to calculate the inclination direction from a positional relationship of the detection points in the reference coordinate system.

* * * * *